US012753616B2

(12) United States Patent
Müller et al.

(10) Patent No.: US 12,753,616 B2
(45) Date of Patent: Oct. 6, 2026

(54) STABILITY MONITORING FUNCTION FOR A THICK MATTER CONVEYING SYSTEM

(71) Applicant: Putzmeister Engineering GmbH, Aichtal (DE)

(72) Inventors: Ansgar Müller, Aichtal (DE); Dennis Odukwe, Aichtal (DE)

(73) Assignee: Putzmeister Engineering GmbH, Aichtal (DE)

( * ) Notice: Subject to any disclaimer, the term of this patent is extended or adjusted under 35 U.S.C. 154(b) by 321 days.

(21) Appl. No.: 18/552,097

(22) PCT Filed: Mar. 21, 2022

(86) PCT No.: PCT/EP2022/057309
§ 371 (c)(1),
(2) Date: Sep. 22, 2023

(87) PCT Pub. No.: WO2022/200254
PCT Pub. Date: Sep. 29, 2022

(65) Prior Publication Data
US 2024/0175276 A1 May 30, 2024

(30) Foreign Application Priority Data
Mar. 23, 2021 (DE) ..................... 10 2021 107 142.9

(51) Int. Cl.
*E04G 21/04* (2006.01)
*B60S 9/02* (2006.01)

(52) U.S. Cl.
CPC ............ *E04G 21/0463* (2013.01); *B60S 9/02* (2013.01); *E04G 21/0436* (2013.01)

(58) Field of Classification Search
CPC .... E04G 21/0463; E04G 21/0436; B60S 9/02
See application file for complete search history.

(56) References Cited

U.S. PATENT DOCUMENTS 4,833,615 A * 5/1989 Bitner ................... B66C 15/045 340/685
6,202,013 B1 * 3/2001 Anderson ........... E04G 21/0436 701/50

(Continued)

FOREIGN PATENT DOCUMENTS

CN 1997801 A 7/2007
DE 102015208071 A1 11/2016

(Continued)

OTHER PUBLICATIONS

WO 2019175400 A1 machine translation (Year: 2019).*

(Continued)

*Primary Examiner* — Fadey S. Jabr
*Assistant Examiner* — Mark Robert Heim
(74) *Attorney, Agent, or Firm* — Alix, Yale & Ristas, LLP

(57) ABSTRACT

The invention relates to, inter alia, a thick matter conveying system (10) comprising a thick matter pump (16) for conveying a thick matter; a thick matter distributing mast (18) for distributing the thick matter to be conveyed, said thick matter distributing mast (18) having a rotary mechanism (19) which can be rotated about a vertical axis and a mast assembly (40) comprising at least two mast arms (41); a substructure (30) on which the thick matter distributing mast (18) and the thick matter pump (16) are arranged, said substructure (30) comprising a support structure (31) for supporting the substructure (30) by means of at least one horizontally and/or vertically movable support leg (32); a sensor unit (11) comprising a plurality of sensors (111, 112, 113, 114, 115) for detecting a respective piece of operating information, wherein the sensor unit (11) is at least designed to detect a first piece of operating information which indicates the position of the rotary mechanism (19), a second piece of operating information which indicates the position (Continued)

of at least one of the mast arms (41), a third piece of operating information which indicates the position of the support leg (32), and a fourth piece of operating information which indicates the inclination angle of the thick matter conveying system (10); and a processing unit (12) for determining a stability parameter of the thick matter conveying system (10) on the basis of the at least one detected piece of operating information.

17 Claims, 3 Drawing Sheets

(56) References Cited

U.S. PATENT DOCUMENTS

| | | | | |
|---|---|---|---|---|
| 6,351,696 | B1 * | 2/2002 | Krasny | B66C 23/80 701/50 |
| 6,871,667 | B2 * | 3/2005 | Schwing | E04G 21/04 141/387 |
| 7,011,108 | B2 * | 3/2006 | Benckert | B66C 13/40 137/624.11 |
| 7,729,832 | B2 * | 6/2010 | Benckert | E04G 21/0463 222/533 |
| 7,909,059 | B2 * | 3/2011 | Wehner | B66C 23/78 141/387 |
| 8,694,204 | B2 * | 4/2014 | Reeb | E02F 9/2033 701/50 |
| 9,082,288 | B2 * | 7/2015 | Wei | F04B 15/02 |
| 9,381,844 | B2 * | 7/2016 | Yi | E04G 21/0436 |
| 10,048,158 | B2 * | 8/2018 | Lawler | A01G 23/081 |
| 10,099,660 | B2 * | 10/2018 | Mayer | E04G 21/0445 |
| 10,526,804 | B2 * | 1/2020 | Klein | B60S 9/10 |
| 10,913,639 | B2 * | 2/2021 | Mietzner, Jr. | B66C 23/06 |
| 11,655,642 | B2 * | 5/2023 | Bertram | E04G 21/0463 701/50 |
| 12,024,906 | B2 * | 7/2024 | Müller | E04G 21/0445 |
| 12,416,169 | B2 * | 9/2025 | Benz | E04G 21/0436 |
| 2004/0108003 | A1 * | 6/2004 | Schwing | E04G 21/0418 137/615 |
| 2004/0119597 | A1 * | 6/2004 | Petzold | B66C 23/80 340/679 |
| 2008/0236944 | A1 | 10/2008 | Patron | |
| 2009/0283163 | A1 * | 11/2009 | Wehner | E04G 21/0436 417/234 |
| 2015/0107692 | A1 * | 4/2015 | Hasel | F16L 3/127 29/525.01 |
| 2015/0225970 | A1 * | 8/2015 | Westermann | E04G 21/04 137/615 |
| 2017/0167149 | A1 | 6/2017 | Vierkotten et al. | |
| 2018/0051475 | A1 | 2/2018 | Klein et al. | |
| 2020/0392746 | A1 | 12/2020 | Bertram et al. | |
| 2021/0010281 | A1 | 1/2021 | Müller | |
| 2024/0337118 | A1 * | 10/2024 | Steinwandel | B25J 9/162 |
| 2024/0375891 | A1 * | 11/2024 | Müller | F04B 49/065 |

FOREIGN PATENT DOCUMENTS

| | | | | |
|---|---|---|---|---|
| DE | 102016125145 A1 | | 6/2018 | |
| DE | 102018109057 A1 | * | 10/2019 | B66C 13/066 |
| EP | 2733281 A1 | | 5/2014 | |
| EP | 2799712 A2 | | 11/2014 | |
| EP | 1849931 B1 | | 11/2016 | |
| JP | 2000282687 A | | 10/2000 | |
| WO | WO-2005080706 A2 | * | 9/2005 | E04G 21/04 |
| WO | WO-2016078706 A1 | * | 5/2016 | E04G 21/0445 |
| WO | WO-2019175400 A1 | * | 9/2019 | B66C 23/94 |

OTHER PUBLICATIONS

DE 102018109057 A1 machine translation (Year: 2019).*
WO-2005080706-A2 machine translation (Year: 2005).*
WO-2016078706-A1 machine translation (Year: 2016).*
PCT International Search Report and Written Opinion for International Application No. PCT/EP2022/057309 filed on Mar. 21, 2022; Date of Mailing: Jul. 7, 2022; 12 pgs.
German Office Action for Application No. 10 2021 107 142.9; Dated: Dec. 23, 2021; 7 pgs.
Japanese Examination Report for Patent Application No. 2023-558216, Dispatch Date: Sep. 2, 2025, 8 pgs.

* cited by examiner

STABILITY MONITORING FUNCTION FOR A THICK MATTER CONVEYING SYSTEM

BACKGROUND

The present invention relates, inter alia, to a thick matter conveying system comprising a thick matter pump, a thick matter distributor mast, a substructure, a sensor unit, and a processing unit.

Known from the prior art are generic thick matter or slurry conveying systems. In order to monitor their stability, it is usually necessary to measure or manually enter various operating parameters even before the start-up of the thick matter conveying system, i.e. before the actual conveying process, by way of which operating parameters a conclusion pertaining to any existing or absent stability may then be drawn for the planned operation. The operating parameters considered here are the positions of support legs, the presence of an inclination of the chassis, the position of the slewing gear, and an assumed inclination of 0° or 90° of the first mast arm connected to the slewing gear. Dynamic monitoring of maximum stability is also known, in which the forces exerted on the mast arm joint of the first mast arm are also additionally included. However, such monitoring depends on the respectively prevailing state of operation, so that a statement pertaining to the stability for conveying a specific thick matter can also be made only during the conveying process.

SUMMARY

Against the background of the aforementioned issues it is therefore an object of the present invention to provide an improved thick matter conveying system.

The achievement according to the invention lies in the features of the independent claims. Advantageous refinements are the subject matter of the dependent claims.

Disclosed according to the invention is a thick matter conveying system, having a thick matter pump for conveying a thick matter; a thick matter distributor mast for distributing the thick matter to be conveyed, wherein the thick matter distributor mast has a slewing gear which is rotatable about a vertical axis, and a mast assembly comprising at least two mast arms; a substructure on which are disposed the thick matter distributor mast and the thick matter pump, wherein the substructure comprises a support structure for supporting the substructure by way of at least one horizontally and vertically displaceable support leg; a sensor unit having a plurality of sensors for respectively capturing an item of operational information, wherein the sensor unit is at least specified to capture a first item of operational information indicative of a position of the slewing gear, a second item of operational information indicative of a position of at least one of the mast arms, a third item of operational information indicative of a position of the support leg, and a fourth item of operational information indicative of an inclination angle of the thick matter conveying system; and a processing unit for determining a stability parameter of the thick matter conveying system, depending on the captured items of operational information.

The thick matter conveying system according to the invention is, for example, a truck-mounted concrete pump.

The invention is a particularly advantageous design embodiment of a thick matter conveying system with dynamic and situation-dependent monitoring of stability, which is possible in real time. By determining a stability parameter, taking into account the combination of items of operational information that are representative of a position of the slewing gear, a position of at least one of the mast arms, a position of the support leg, and an angle of inclination of the thick matter conveying system, a statement pertaining to the stability of the thick matter conveying system thus embodied can be made with simple means and in a reliable manner. Even if various other operating parameters of the thick matter conveying system are assumed to be constant by way of approximation, such as, for example, the density of the thick matter to be conveyed, which is typically assumed to be 2300 kg/m$^3$, a particularly high level of accuracy, consistency and flexibility in the stability monitoring of a thick matter conveying system can be achieved here without the need for a pressure sensor system, which is subject to fluctuations, within the mast assembly or in a support leg.

Moreover, a thick matter conveying system with dynamic, low-latency stability monitoring is provided, which can be performed in real time as no complex filtering of signals subject to fluctuation is required. Since the weight of a thick matter that is actually being currently conveyed is not included in the determination of stability, the determination of the current stability is moreover independent of a conveying process of the thick matter actually taking place, so that an early and proactive response can already be made in the event of any problematic stability to be anticipated. In this way, any fluctuations in the mass distribution of the thick matter to be conveyed within the thick matter conveying system, which are associated with the operation of the thick matter pump of the thick matter conveying system, in particular due to the movement of the core pump and the S-pipe, can also be compensated, this contributing toward the reliability and also to the user-friendliness of the stability monitoring. Likewise, a cyclic transgression of a predetermined maximum upper limit of stability, which is caused above all by periodic fluctuations in the operation of the thick matter pump but can be tolerated in principle, and associated switching on and off of the thick matter conveying system, can be avoided.

First, some terms are to be explained hereunder: Thick matter is a generic term for hard-to-convey media. The thick matter, for example, can be a substance with coarse-grained components, a substance with aggressive components, or the like. The thick matter can also be a bulk material. In one embodiment, the thick matter is fresh concrete. Fresh concrete can contain grains up to a size of more than 30 mm, binds, forms deposits in voids, and is therefore difficult to convey. Exemplary thick matters include concrete with a density of 800 kg/m$^3$ up to 2300 kg/m$^3$, or heavy concrete with a density of more than 2300 kg/m$^3$.

The thick matter pump can comprise a core pump with two, for example exactly two, conveying cylinders. In this instance, switching takes place in an alternating manner from the first to the second conveying cylinder and from the second to the first conveying cylinder. An S-pipe can be cyclically switched between the conveying cylinders. In addition, an auxiliary cylinder can be specified so as to bridge each of the transitions.

The slewing gear is rotatable about a vertical axis, for example a central axis of the slewing gear, for example by 360 degrees. The slewing gear may comprise at least one actuator, such as a hydraulic or pneumatic cylinder, or an electromechanical actuator, or a combination of a plurality of, even different types of, actuators by way of which said slewing gear can rotationally change its position in relation to the substructure. To this end, the slewing gear typically comprises a hydraulic motor and a pinion with planetary gearbox.

The mast assembly comprises at least two mast arms, but may also comprise three, four or five mast arms. Typically, the mast assembly comprises three to seven mast arms. Here, the first mast arm at its proximal end is connected to the slewing gear, and at its distal end is connected at the proximal end of an adjacent mast arm. The other mast arms are successive, and at their proximal end respectively connected to a distal end of the adjacent mast arm. The distal end of the mast assembly corresponds here to the distal end of the last mast arm in succession, which moreover has no further connection at its distal end. The distal end of the last mast arm in succession defines a possible load attachment point.

Here, the mast arms within the mast assembly are connected to one another by way of a mast joint respectively in such a way that they can be moved at least, for example exclusively, in one dimension at least independently of the other mast arms. Each mast arm here is assigned the mast joint on the proximal end of the former.

The first mast arm by way of its mast joint is connected to the slewing gear in such a manner that when the slewing gear rotates about its vertical axis, the first mast arm, and in embodiments the entire mast assembly, is also rotated about this axis. For example, the mast arm is fastened to the slewing gear in such a way that said mast arm can be moved, for example exclusively, in a vertical direction independently of the slewing gear and can be rotated by way of the mast joint of said mast arm, for example. It is also conceivable that a mast arm has a telescopic functionality and can be extended or shortened telescopically and continuously along its longitudinal axis. For example, a mast arm is adjustable such that at least the distal end of the mast arm is movable at least in one of the three spatial directions (x, y and z direction).

Alternatively or additionally, a mast arm can be rotatable about its longitudinal axis. For example, a mast arm comprises at least one actuator for its mast joint, such as a hydraulic or pneumatic cylinder, or an electromechanical actuator, or a combination of a plurality of, even different types of, actuators, by way of which said mast arm can change its position relative to at least another mast arm, in particular the mast arm connected at the proximal end. The actuators can be specified, for example, to rotationally pivot the mast arm about a horizontal axis, the latter for example running through its mast arm joint, and/or to move said mast arm in a translatory manner in one, in two, or in all spatial directions.

Alternatively or additionally, the mast arm may have further actuators by means of which said mast arm can be, for example telescopically, extended or shortened or rotated.

The substructure is a basic structure, for example a chassis, on which the thick matter distributor mast and the thick matter pump are disposed. For example, the thick matter distributor mast and/or the thick matter pump are/is fastened to the substructure. The substructure can be configured to be stationary (for example as a platform), or mobile (for example as a vehicle). As a result of the thick matter distributor mast and the thick matter pump being disposed on the substructure, the entire thick matter conveying system can be configured to be particularly compact as a unit, and for example in the form of a truck-mounted concrete pump.

The thick matter conveying system comprises means for carrying out or controlling the method according to the invention. These means comprise in particular the sensor unit and the processing unit, but may also comprise a control unit of the thick matter conveying system, and may be configured as respectively separate hardware and/or software components or as hardware and/or software components integrated in various combinations. The means comprise, for example, at least one memory with program instructions of a computer program, and at least one processor designed for executing program instructions from the at least one memory.

The sensor unit is designed to capture at least one item of operational information, in particular automatically and independently of a user input. It is conceivable that an item of operational information is captured repeatedly at specified temporal intervals. For example, the acquisition of an item of operational information can take place by measuring a measurement variable which is characteristic of this item of operational information. The sensor unit may comprise here one or more sensors of the same type or of different type. Exemplary sensors are angle measuring sensors (e.g. for capturing a position of the slewing gear), force and pressure sensors (e.g. for capturing a cylinder force of a mast joint of a mast arm or a force acting on an actuator of a mast arm), position sensors (e.g. sensors of a satellite-based position system such as GPS, GLONASS or Galileo), position sensors (e.g. spirit or air levels or inclination sensors for capturing an angle of inclination), electrical sensors (e.g. induction sensors), optical sensors (e.g. light barriers, laser sensors or 2D scanners for capturing the type of the thick matter to be conveyed) as distance sensors for capturing a distance, or acoustic sensors (e.g. ultrasonic sensors for capturing the density of the thick matter to be conveyed, or vibration sensors). Likewise, an item of operational information can also be captured by the interaction of a plurality of sensors of the sensor unit. In this way, for example, a position of a mast arm can be captured advantageously by combining the measurements of an angle measuring sensor and a position sensor.

Alternatively or additionally, the sensor unit may also comprise one or more (e.g. wireless) means of communication, by way of which (e.g. externally) captured or defined items of operational information can be received at the sensor unit.

The processing unit should be understood as being specified to determine a stability parameter of the thick matter conveying system. This should take place so as to at least depend on the captured items of operational information. To this end, the processing unit may have access to the items of information captured by the sensor unit, for example. The determination of the stability parameter is to be understood to mean that the stability parameter is calculated depending on the captured items of operational information on the basis of defined properties of components of the thick matter conveying system that are assumed to be constant, such as their mass or their spatial extent. Additionally, other properties such as the mutual positioning of the support legs, the influence of wind surfaces of the components, as well as defined safety or limit values can also be taken into account in the process.

The substructure comprises a support structure for supporting the substructure by way of at least one horizontally and/or vertically displaceable support leg. A support leg of a thick matter conveying system represents a component of the support structure that serves to increase the stability of the thick matter conveying system. The influence of the support structure on stability depends in particular here on an individual arrangement and set-up of support legs. To this end, the support leg is able to be supported on a ground by way of a support plate. Four support legs are usually provided for a support structure.

The stability of the support structure, and thus of the entire thick matter conveying system, is higher the greater the spacing of the line of action, which takes into account all the forces acting on the thick matter conveying system, from the tilting edges of the contact surface. However, a reliable statement pertaining to the stability can already be made on the basis of a line of action that at least takes into account the weight force acting on the thick matter conveying system. The more of the forces actually acting in the line of action are taken into account, the more precise this statement can be made. Therefore, the stability of the thick matter conveying system can be characterized particularly advantageously by a stability parameter representing the spacing of the line of action from the tilting edges of the contact surface. The stability parameter is located within a defined or dynamically determinable stability range, within which the distance of the line of action from each of the tilting edges is greater than or equal to zero, preferably in this case still a safety margin is taken into account. The stability of the support structure and thus of the thick matter conveying system is ensured within the stability range. The upper limit of the stability range is defined by a maximum stability parameter. The maximum stability parameter is present when the spacing of the line of action from one of the tilting edges is zero. Accordingly, the spacing of the line of action from at least one of the tilting edges decreases as the stability parameter increases. Above the upper limit, the distance is less than zero and the stability of the thick matter conveying system is no longer guaranteed. It is conceivable that a stability range for each operating situation of the thick matter conveying system is specified or determinable, for example taking into account properties of the components, to be taken into account, of the thick matter conveying system that are assumed to be constant. For example, for each possible arrangement of the support structure, for example, by a determined set-up of support legs, a contact surface can be defined or determinable for this purpose.

The spacing of the line of action from one of the tilting edges and the orientation of the line of action are respectively at least dependent on the weight force of the thick matter conveying system and can be calculated, for example, by the processing unit. The orientation of the line of action may have vertical and horizontal direction components, and may depend on directions of action and/or values of a plurality of forces. For example, one or more forces to be taken into account here can be defined or can be selectable by a user (e.g. by means of a suitable user interface). If, for example, only the weight force of a thick matter conveying system is taken into account, then the line of action corresponds to a plumb line running through the overall center of gravity. The orientation of the line of action in this instance is identical to the orientation of the plumb line. If the orientation of the line of action additionally depends on a force having a horizontal component, such as a wind force acting on the side of the thick matter conveying system, then the orientation of the line of action also includes at least one horizontal component, and the orientation of the line of action is not equal to the plumb line. It is conceivable that the orientation of the line of action is dependent on one or more additional forces in such a way that the processing unit, preferably only, upon the occurrence of one or more specific conditions, for example above a wind force prevalent in the operation of the thick matter conveying system, is able to adapt the orientation gradually, for example by a respective defined amount in a defined direction. It is also conceivable that the orientation of the line of action depends on the directions of action and/or values of one or a plurality of, preferably all, items of operational information that are indicative of forces and captured by the sensor unit.

For example, the stability range can be described as a distance margin having a minimum value which, when exceeded, no longer provides the stability of the support structure. In this way, any movement of a component can lead to a decrease, for example, in a deflection of a mast arm of a thick matter distributor mast in the distal direction, or to an increase, again for example in a deflection of a mast arm in the proximal direction, of the distance margin. If the distance margin has been used up, a maximum stability parameter is present and the upper limit of the stability range has been reached. If the operation of the component under consideration is effected in such a way that it is to be expected that the distance margin increases, then such an operation can take place, optionally at a reduced speed.

An item of operational information is indicative of a property or an operating parameter of a multiplicity of possible properties and operating parameters of the thick matter conveying system or individual components of the thick matter conveying system, and representative of that property or that operating parameter. It should thus be possible to be able to assign an item of operational information to a component. Such a property or such an operating parameter can be characterized, for example, by a measured variable. These can be properties and operating parameters that come to light even before or only after a start of the conveying process. For example, the acquisition of an item of operational information can take place by measuring a measurement variable which is characteristic of this item of operational information. Likewise, an item of operational information captured by the sensor unit can be the result of an upstream calculation, in which, for example, one or more measured variables have in turn been entered. It is conceivable that such an upstream calculation is performed directly on site in a correspondingly specified unit of the thick matter conveying system, but it may also have been performed externally, for example on a server device, and the thus calculated item of operational information can then be received from the sensor unit, for example at a communication interface.

The first item of operational information is indicative of a position of the slewing gear. The consideration of this property is relevant in order to determine the center of gravity of the mast assembly. Likewise, an asymmetrical alignment of the support structure or an operation on inclined ground, and thus an asymmetry of the contact surface, can be included in the determination of the stability parameter as a result.

The position of at least one of the mast arms is taken into account in the second item of operational information. This can be an absolute position, i.e. position and/or orientation, or else a relative position. A position can be captured, for example, in the form of an inclination angle of the mast arm relative to the plumb direction by means of an inclination sensor. A relative position can be characterized by the position of a mast arm in comparison to another mast arm connected at the proximal end of the mast arm. In the case of the first mast arm connected to the slewing gear, this can be the position relative to the vertical axis of the slewing gear. Because the dimensions of the mast arm and the positions of the mast arm or slewing gear to be set in relation are known, the position of a mast arm can already be unequivocally determined by capturing the relative position, for example the inclination angles.

The third item of operational information is indicative of a position of a support leg of the support structure. With the aid of the set-up of support legs, the contact surface can be increased particularly easily and the stability area can be increased in terms of at least one tilting edge. Therefore, the position of the at least one support leg is of particular relevance for the determination of the stability parameter. In particular, the horizontal spacing of the set-up surface and the direction of the horizontal spacing of the support leg in the respectively present operating state in comparison to a zero position in the retracted state is determined here. Additionally, the vertical spacing can also be ascertained and taken into account here. It is also conceivable that the leg position sensor is designed as a GPS sensor.

The fourth item of operational information is indicative of an inclination angle of the thick matter conveying system. The inclination angle is to be an angle of the thick matter conveying system, for example of its substructure, in relation to the plumb direction. For example, the inclination angle of the thick matter conveying system corresponds to an angle between the rotation axis of the slewing gear and the plumb direction. If the thick matter conveying system is operated on an inclined plane, i.e. when inclined, the normal force which maintains stability can be significantly lower than the weight force of the thick matter conveying system, and the spacing of the line of action from the tilting edges can change. Therefore, the inclusion of an inclination angle of the thick matter conveying system is particularly significant when determining the stability parameter.

Further exemplary items of operational information are indicative of weights of all mast arms with a filled and/or with an unfilled conveyor line, of positions of the centers of gravity of all mast arms, of weights of additional loads, of positions of additional weight attachment points, of wind forces acting on the mast arms, of positions of the wind surface centers of gravity of all mast arms, of a weight of the substructure, of a position of the centers of gravity of the substructure, of positions of the set-up surfaces of the support legs in the retracted and/or in the extended state, and/or of leg forces.

According to one embodiment, the sensor unit is specified to capture for all mast arms an item of operational information indicative of a position of one of the mast arms.

If the position of all mast arms of the mast assembly is captured, it is not necessary to resort to extreme values to be assumed, which in the industry are fundamentally conservative. This allows the current stability to be adapted to the situation and determined much more precisely as a result of the determination of a stability parameter.

Alternatively, the sensor unit can be specified to capture an item of operational information indicative of a position of one of the mast arms, only for a number of mast arms which is less than the total number of mast arms. For example, it can be provided that the sensor unit can only record an item of operational information indicative of a position of the mast arm only for one of the mast arms.

This represents a penalty in terms of accuracy when determining the stability parameter. However, such an embodiment of the sensor unit permits that fewer items of operational information have to be captured, which makes the determination significantly easier, less computationally intensive and less complex overall. The number of sensors used can also be minimized.

Preferably, the processing unit is specified to calculate a current position of a mast assembly center of gravity of the thick matter conveying system, depending on the second captured item of operational information, and to determine the stability parameter depending on the calculated current position of the mast assembly center of gravity.

The mast assembly center of gravity is to be understood to mean the theoretical center of gravity of the mast assembly. In order to calculate the latter, the second captured item of operational information, i.e. an item of operational information indicative of a position of at least one mast arm, is used. Moreover, the weights of the individual mast arms and the total weight of the mast assembly are also taken into account. In each case, the weight of a quantity of the thick matter to be conveyed can be included here. The amount considered in this case should correspond to the amount of the thick matter to be conveyed that is located in a section of a conveying line that extends across the mast assembly, which is assigned to the respective mast arm. Corresponding items of operational information can be captured by the sensor unit or be defined. An exemplary calculation of the position of the mast assembly center of gravity $x_s$ can be made according to the formula.

$$x_s = \frac{1}{m} * \sum_{i=1}^{n} x_s(i) * m(i)$$

Here, m(i) describes the respective mass of the $i^{th}$ mast arm of a mast assembly with a number of n mast arms to be taken into account, and m describes the mass of the mast assembly as a whole. In turn, the position of the center of gravity of the $i^{th}$ mast arm $x_s(i)$ can be calculated by:

$$x_s(i) = \sum_{j=0}^{i-1} l(j) * \cos(\phi(j)) + x_{s_{local}}(i) * \cos(\phi(i)) + y_{s_{local}}(i) * \sin(\phi(i))$$

Here, l(j) describes the length of the $j^{th}$ mast arm, and cos (ϕ(i)) or cos (ϕ(j)) describes the inclination angle of the $i^{th}$ or $j^{th}$ mast arm, respectively. $x_{s_{lokal}}$ and $y_{s_{lokal}}$ represent the coordinates of the center of gravity of the $i^{th}$ mast arm in the local coordinate system of the $i^{th}$ mast arm. The mass m of the mast assembly as a whole as well as the masses m(i) and lengths l(i) of the individual mast arms can respectively be a property, assumed to be constant, of the mast assembly, but one or more of the masses can in particular also be captured situationally, for example by the sensor unit. For example, in the case of the masses, the mass of the amount of the thick matter to be conveyed, which is located in the corresponding section of the conveyor line, or of which it can be at least assumed that it is located in the corresponding section of the conveyor line during conveying, is also taken into account respectively.

Such a consideration of a mast assembly center of gravity permits a reliable determination of the stability parameter.

Further preferably, the processing unit is specified to calculate the current position of the mast assembly center of gravity depending on items of operational information which are indicative of positions of all mast arms of the mast assembly.

In this case, in the calculation example shown above, the number n of the mast arms to be taken into account corresponds to the total number of mast arms of the mast assembly. This enables a particularly accurate calculation of the mast assembly center of gravity and consequently also a particularly precise determination of the stability parameter.

In another embodiment, if for a mast arm an item of operational information indicative of a position of this mast arm cannot be captured by the sensor unit, such an item of operational information indicative of the position of this mast arm which represents a horizontal inclination of the respective mast arm is taken into account when calculating the current position of the mast assembly center of gravity.

A mast arm with horizontal inclination has an inclination angle of 0°, so that the influence of the mast arm on the stability parameter is assumed to be increasing the latter to the maximum. Therefore, if no currently captured item of operational information should be available for a mast arm, a worst-case assumption for the position of this mast arm is used. Accordingly, a greater influence of the respective mast arm, which worsens stability, is assumed to be actually prevalent, as a result of which additional safety is installed.

According to one exemplary embodiment, the sensor unit is specified to capture a further item of operational information, indicative of a type of a thick matter to be conveyed, and the processing unit is specified to calculate the current position of the mast assembly center of gravity depending on the further captured item of operational information and/or to determine the stability parameter depending on the further captured item of operational information.

Among other things, for capturing such an item of operational information, the sensor unit may comprise, for example, a communication interface and/or a user interface. The communication interface may comprise one or more (e.g. wireless) means of communication by way of which an item of operational information which is captured externally and, for example, provided by a user at a user terminal via user input and characterizes a type of thick matter to be conveyed is received in a way known to a person skilled in the art. If a user interface is provided for capturing the item of operational information, said user interface can be configured as at least one button, a keypad, a keyboard, a mouse, a display unit (e.g. a display), a microphone, a touch-sensitive display unit (e.g. a touch screen), a camera and/or a touch-sensitive surface (e.g. a touchpad). For example, the capturing of the item of operational information takes place by capturing a corresponding user input at the user interface. However, it is also conceivable that the type of the thick matter is captured by means of a suitable sensor or a combination of sensors of the sensor unit, for example by means of an optical sensor.

The type of a thick matter, for example, is to be understood to mean the material composition, the density and/or the viscosity of the thick matter to be conveyed. The capturing of the type of a thick matter to be conveyed here allows conclusions to be drawn about its mass distribution within the thick matter conveying system, in particular within the conveyor line, during the conveying of the thick matter. As a result, a calculation of the current position of the mast assembly center of gravity, and/or a determination of the stability parameter, independently of a conveying process of a thick matter actually taking place, which is adapted to a specific conveying process can take place individually and thus particularly accurately.

According to one embodiment, the processing unit is specified to calculate a current position of the overall center of gravity of the thick matter conveying system from the captured items of operational information, and to determine the stability parameter depending on the calculated current position of the overall center of gravity.

To this end, the processing unit must indeed take into account a multiplicity of properties of the thick matter conveying system, such as weight and center of gravity position of one, several or all components. Nevertheless, a particularly reliable determination of the stability parameter can take place in this way.

Additionally, the processing unit can be specified to calculate the respective spacing of a line of action of at least one force acting on the thick matter conveying system from the tilting edges of the contact surface, and to determine the stability parameter depending on the calculated distance, wherein the at least one force acting on the thick matter conveying system comprises a weight force of the thick matter conveying system acting at the current position of the overall center of gravity of the thick matter conveying system.

At a large spacing from each of the tilt edges, a smaller stability parameter is determined here than at a small spacing. If the spacing from one of the tilting edges is less than zero, the stability parameter exceeds the stability range and the stability of the thick matter conveying system is no longer provided. The stability range of the thick matter conveying system, which can be described as a distance margin for the spacing, can increase, for example, as a result of a further distally displaced arrangement of the tilting edge closest to the line of action. Such a displacement of the arrangement can be achieved by distally displaced positioning of one or a plurality of support legs further away from the line of action.

The stability of the support structure, and thus of the entire thick matter conveying system, is higher the greater the spacing of the line of action from the tilting edges of this surface.

This represents a reliable possibility for determining the stability parameter, and permits a reliable statement pertaining to the stability of the thick matter conveying system.

Preferably, the thick matter conveying system comprises a control unit for outputting a first control signal if the determined stability parameter of the thick matter conveying system is greater than a maximum stability parameter of the thick matter conveying system, and for outputting a second control signal if the determined stability parameter of the thick matter conveying system is less than or equal to the maximum stability parameter of the thick matter conveying system.

The control unit includes corresponding means to output control signals, such as a wired or wireless signal output. As a result of the output of control signals in the manner described, the control unit can control at least one component of the thick matter conveying system, and act on an operating parameter of the component. It is conceivable that while outputting the second control signal causes a continuation of the correct operation, outputting the first control signal, on the other hand, causes a discontinuation of the correct operation of the thick matter conveying system. Outputting the further control signals can, for example, cause the operation of one or more components of the thick matter conveying system to take place at a reduced speed in comparison to the correct operation.

For example, the control unit can be specified to limit an operating range of the mast assembly to a currently permissible operating range, if the determined stability parameter of the thick matter conveying system is greater than the maximum stability parameter, to which end the control unit comprises corresponding means.

Limiting an operating range of one or more components such as the thick matter conveying system is understood to mean that an operating parameter of the respective component is limited and operation of the component is effected according to the limited operating parameter. This means that the respective operating parameter can be limited to a still permissible scope of action, or a still permissible intensity of action, of the component, depending on the determined stability parameter. The operation of the component outside the permissible operating range is prevented in particular. Upon limiting, the scope of action or the intensity of action is smaller than the maximum scope of action provided respectively for the component in principle, for example during the correct operation, and the maximum intensity of action fundamentally provided. For example, the control unit can determine a currently permissible upper limit for the operating range of the mast assembly, and the operation of the thick matter conveying system can be effected in such a manner that the mast assembly is deflected only below the determined upper limit. Accordingly, it can be prevented in this instance, for example, that the opening angle or the actuator force of a mast arm of the mast assembly exceeds a correspondingly determined limit. To this end, the respective actuator can, for example, receive a control signal suitable therefor, which is output by the control unit. For example, the control unit can thus limit the deflection of a mast arm by an actuator. Moreover, limiting the operating range of the mast assembly should also be understood as an additional or alternative limiting of the rotation angle range of the slewing gear.

At least two, preferably three, items of operational information of the same type are advantageously captured. Two items of operational information should be considered as identical types, which are respectively captured for a multiple component. For example, in an embodiment of the thick matter conveying system with at least two support legs, an item of operational information representative of a leg position of a first support leg of the thick matter conveying system and a further item of operational information representative of a leg position of a second support leg are thus of the same type if the thick matter conveying system comprises more than one support leg.

Preferably, the sensor unit is further adapted to capture a further item of operational information, indicative of an extension of the thick matter conveying system.

An extension is present when the thick matter conveying system is supported by its support structure, for example the support legs of the support structure. In addition, the extension under consideration can be further characterized, for example, by way of its height. The latter can be defined, for example, by the size of a vertical spacing of the set-up surface of the support leg in relation to a, for example predefinable, zero position. Alternatively, or in addition, a vertical spacing of another component of the thick matter conveying system, such as the substructure, can also be used. An extension can likewise also be established by exceeding a defined threshold of a captured vertical leg force. If the thick matter conveying system is configured as a truck-mounted concrete pump, the extension can also be characterized by measuring the spring travel of the vehicle axles. The presence of an extension has effects on the position of the overall center of gravity and thus on the stability of the thick matter conveying system. By capturing the extension, it can be ensured above all that mass components of the thick matter conveying system to be considered are not sprung on the ground and, if applicable, cannot be taken into account as a counterweight. Taking into account the extension in the determination of the stability parameter therefore allows an even more precise determination of stability.

Optionally, the sensor unit is further specified to capture a further item of operational information, indicative of a horizontal or vertical leg force of the support leg.

A horizontal or vertical leg force is to be understood to mean a horizontal or vertical force acting on a support leg. Usually, the sensor unit comprises one or more leg force sensors per support leg to this end. Likewise, the sensor unit can be specified to capture an item of operational information indicative of the horizontal or vertical leg force of the support leg by way of a calculation dependent on one or a plurality of further items of operational information or measured variables, to which end said sensor unit can, for example, access the functionality of a correspondingly specified unit of the thick matter conveying system, for example the processing unit.

For example, the item of operational information indicative of the vertical leg force of the support leg can be calculated depending on the third item of operational information, indicative of the position of a support leg, and an item of operational information indicative of the overall center of gravity. To this end, such a coordinate system can be taken into account in which the y-axis runs parallel to the rotary axis of the slewing gear and the x- and z-axes each are perpendicular to one another and to the y-axis. By means of the overall center of gravity and the gravitational vector in the plumb direction, a resultant force $F_{total,y}$ in the y-direction can be calculated, which is counteracted by the forces $F_i$ acting on the n support legs. Further, the load torque $M_{Load}$ can be divided into the coordinate directions z and x to $M_{total,z}$ and $M_{total,x}$. By way of approximation, taking into account the leg positions P of the n support legs, the system of equations applies:

$$\sum F_y = \sum_n F_i - F_{total,y} = 0$$

$$\sum M_x = -\sum_n F_i \cdot P_{i,z} - M_{total,x} = 0$$

$$\sum M_z = -\sum_n F_i \cdot P_{i,x} - M_{total,z} = 0$$

If more than three support legs are provided, an unequivocal solution is not possible. Additional assumptions can then be made to simplify the system of equations. For example, the support legs can be assumed to be springs with different spring constants $C_i$. With dy as the displacement in the y-direction and dϕx and dϕz as rotations about the x- and the z-axis, the result is $$F_i = C_i \cdot (dy + P_{i,z} \cdot d\varphi_x - P_{i,x} \cdot d\varphi_z)$$

If a negative value results in this calculation for a leg force, this is a sign that the support leg in question is lifting off. The system of equations can then be solved without taking this support leg into account. In this way, an item of operational information indicative of the vertical leg force of a support leg can be captured by means of calculation, taking into account further items of operational information.

The features described above permit an even more precise and more reliable determination of the stability parameter.

Preferably, both the slewing gear and a first mast arm of the mast assembly as well as respectively two of the mast arms are each connected to one another by way of an articulated joint, wherein the position of a mast arm is continuously detectable by determining the opening angle of the articulated joint at a proximal end of the mast arm. For example, the opening angle can be ascertained by comparing the inclination angles of the mast arms connected by way of the articulated joint. In addition, the control unit can be specified to limit the operating range of the mast assembly to the currently permissible opening angle by restricting the pivoting capability of the mast arm. Moreover, it is conceivable that all articulated joints have mutually parallel articulated axes. Further, the respective articulated joints can have a maximum opening angle of 120 degrees, preferably of 150 degrees, and particularly preferably of 180 degrees. However, opening angles between 180 degrees and 235 degrees, up to 270 degrees or up to 360 degrees, are also conceivable.

This represents a particularly easy-to-implement and functional embodiment of the connection between mast arms or between the mast arm and the slewing gear, respectively, in which a large scope of action for the thick matter distributor mast is nevertheless maintained. Moreover, in such an embodiment the sensor unit can record the position of a mast arm particularly easily by ascertaining the corresponding inclination angles. A use of complex and extensive sensor systems for capturing the position of the mast arm can be avoided.

Further, the sensor unit can be specified to capture a further item of operational information, indicative of a joint torque of a mast arm.

The joint torque of a mast arm is the torque acting on its mast joint. This represents a torque that depends, inter alia, on the total weight of the mast assembly, on wind loads, on the weight of a thick matter currently conveying, or also on a weight acting at the distal end of the first mast arm of the mast assembly, corresponding to a mast peak load. The joint torque can be concluded, for example, by measuring a cylinder force acting in an actuator of the respective mast arm or a cylinder pressure acting in the actuator of the mast arm in conjunction with one or a plurality of other measurements, such as a measurement of the respective joint angle on the joint torque. For example, the joint torque of a mast arm can be calculated by means of a transmission function from a cylinder force and an articulation angle of the mast joint of the respective mast arm.

In addition, the processing unit can be specified to calculate a load torque based on captured items of operational information indicative of the joint torques of all mast arms, and to determine the stability parameter depending on the calculated load torque.

In this way, the processing unit can perform a particularly precise determination of the stability parameter in real time, for example while taking into account the cylinder pressure and the inclination angle of the respective mast arms. Nevertheless, the sensor unit in this instance must be specified to capture items of operational information indicative of the cylinder force and the inclination angles of all mast arms, and comprise a plurality of sensors suitable for this purpose, for example.

In a further embodiment, the processing unit is specified to determine the stability parameter depending on an item of operational information indicative of a currently permissible theoretically maximum load torque. This also enables a so-called pump prediction, i.e. a determination whether pumping could also be performed at a given mast position.

According to one embodiment, the thick matter pump comprises a double-piston core pump and a switchable S-pipe having an end which is disposed on an outlet of the thick matter pump and is connectable to a conveying line extending across the mast assembly, and wherein the sensor unit is specified to capture another item of operational information indicative of a pumping speed of the core pump, or another item of operational information indicative of a switching speed of the S-pipe.

The S-pipe is a movable pipe section by which the conveying cylinders are alternately connected to the outlet of the thick matter pump. The pipe section and the auxiliary cylinder can be elements of an assembly that is releasably connected to the thick matter pump. This can facilitate maintenance and cleaning of the thick matter pump.

The pumping speed and the switching speed, respectively, are typically non-uniform, which is associated with an inconstant speed of the conveying of the thick matter in the form of pump pulses. This, in turn, leads to a fluctuating mass distribution and acceleration of the thick matter to be conveyed within the conveying line of the thick matter conveying system, i.e. within the spatial region between the thick matter pump and the distal end of the mast assembly. This dynamically changing mass distribution can thus be taken into account when determining the stability parameter. Instead of the pump speed, a pump frequency can also be considered, and instead of the switching speed, a switching frequency can also be considered. Typically, the values of the pump frequency and the switching frequency are the same in this instance.

Moreover disclosed according to the invention is a method for operating a thick matter conveying system, having a thick matter pump for conveying a thick matter, a thick matter distributor mast for distributing the thick matter to be conveyed, wherein the thick matter distributor mast has a slewing gear which is rotatable about a vertical axis, and a mast assembly comprising at least two mast arms, a substructure on which are disposed the thick matter distributor mast and the thick matter pump, wherein the substructure comprises a support structure for supporting the substructure by way of at least one horizontally and vertically displaceable support leg, and having a sensor unit having a plurality of sensors for capturing respectively an item of operational information, and having a processing unit, the method comprising the steps: capturing a first item of operational information, indicative of a position of the slewing gear; capturing a second item of operational information, indicative of a position of at least one of the mast arms; capturing a third item of operational information, indicative of a position of the support leg; capturing a fourth item of operational information, indicative of an inclination angle of the thick matter conveying system; and determining, by the processing unit, a stability parameter of the thick matter conveying system, depending on the captured items of operational information.

In one embodiment, the method further comprises the steps: outputting, by a control unit of the thick matter conveying system, a first control signal if the determined stability parameter of the thick matter conveying system is greater than a maximum stability parameter of the thick matter conveying system; and outputting, by the control unit, a second control signal if the determined stability parameter of the thick matter conveying system is less than or equal to the maximum stability parameter of the thick matter conveying system.

Additionally, the outputting of the first control signal can comprise: limiting the operating range of the mast assembly to a currently permissible operating range.

For the further explanation of further advantageous developments of the methods, reference is made to the above-described refinements of the thick matter conveying system.

The invention also comprises a computer program with program instructions to cause a processor to carry out and/or control the method according to the invention when the computer program is executed on the processor. The computer program according to the invention is stored, for example, on a computer-readable data carrier.

The embodiments and configurations described above are to be understood only as exemplary and are not intended to limit the present invention in any way.

BRIEF DESCRIPTION OF THE DRAWINGS

The invention will be explained in more detail hereunder with reference to the appended drawings by way of advantageous embodiments. In the figures.

DETAILED DESCRIPTION

Figure 1A:
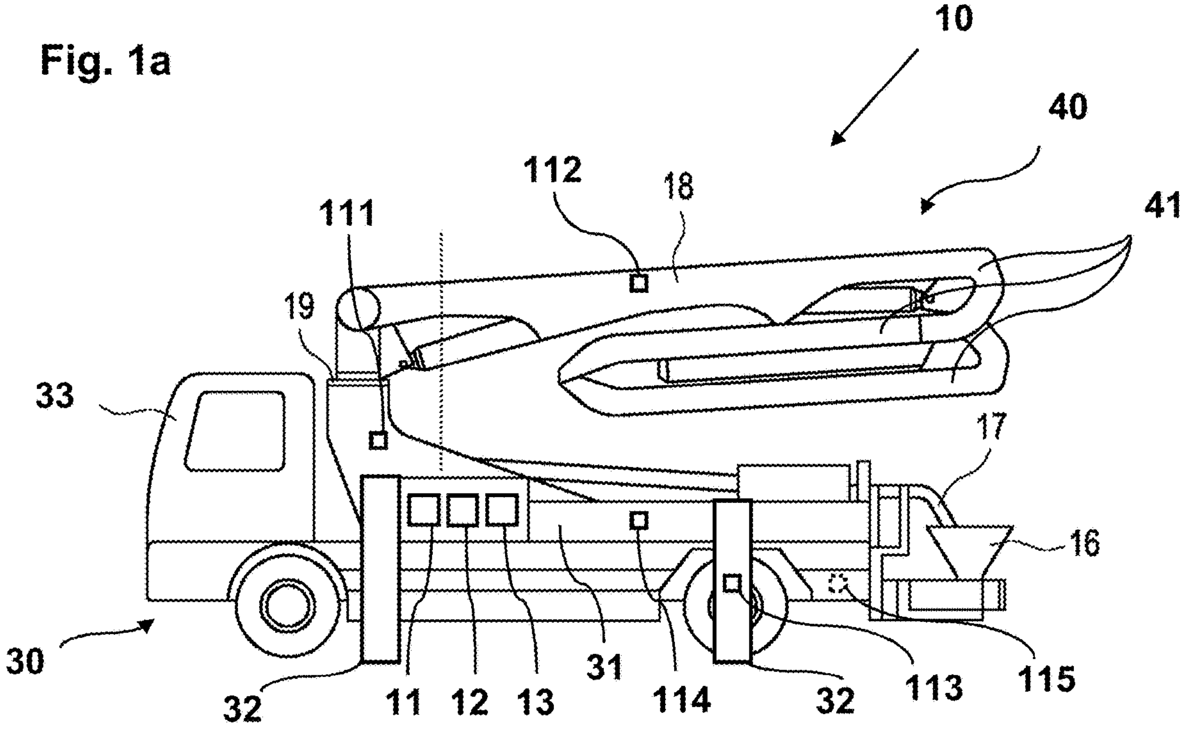
FIG. 1*a* shows a schematic representation of an exemplary embodiment of a thick matter conveying system according to the invention.
Figure 1B:
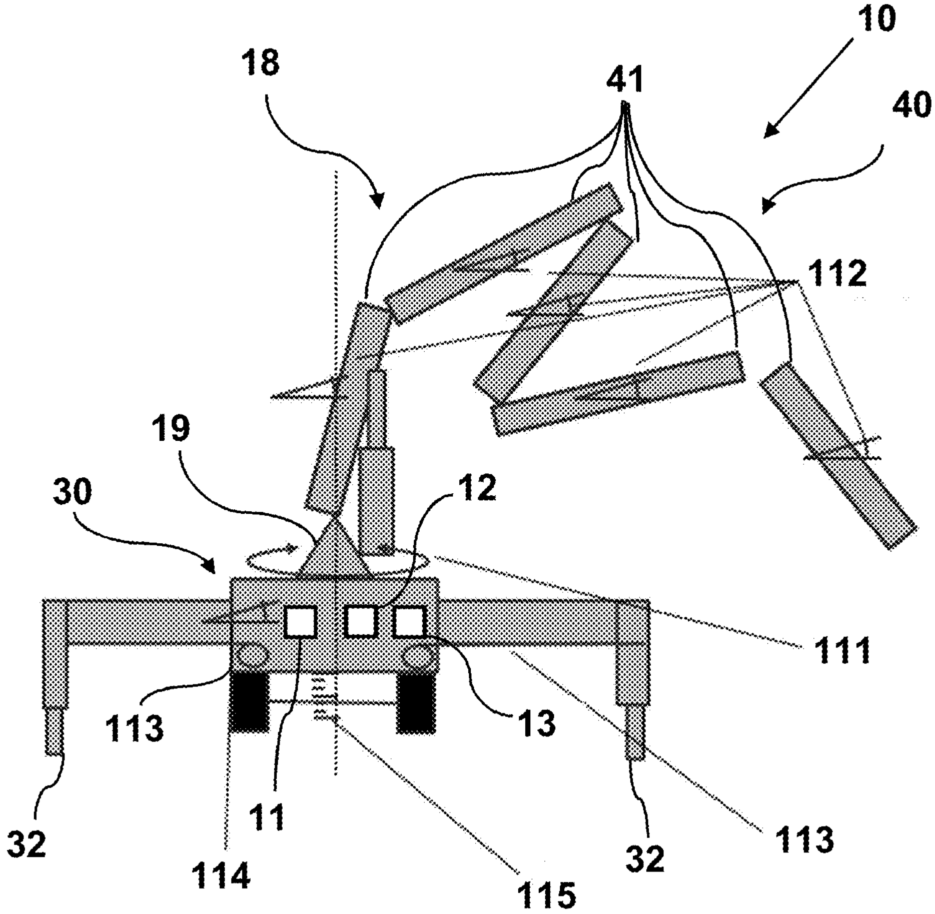
FIG. 1*b* shows a further schematic representation of an exemplary embodiment of a thick matter conveying system according to the invention.

Shown in FIGS. 1*a* and 1*b* are various views of a thick matter conveying system 10. FIG. 1*a* represents a lateral view and FIG. 1*b* represents a rear view of a thick matter conveying system 10, wherein in FIG. 1*b* only a subset of the elements of the thick matter conveying system 10 is reproduced. The thick matter conveying system 10 comprises a thick matter pump 16 for conveying a thick matter, and a thick matter distributor mast 18 for distributing the thick matter to be conveyed, wherein the thick matter distributor mast 18 has a slewing gear 19 which is rotatable about a vertical axis (shown in dotted lines) and a mast assembly 40 with mast arms 41. Further illustrated is also a conveying line 17 which extends across the mast assembly 40 and is connected to an end of an S-pipe of the thick matter pump 16 that is disposed on an outlet of the thick matter pump 16.

Further, the thick matter conveying system 10 comprises a substructure 30 on which are disposed the thick matter distributor mast 18 and the thick matter pump 16. The substructure 30 has a support structure 31 having four support legs 32 for supporting the substructure 30. The substructure 30 by way of example is shown as disposed on a vehicle 33.

Further provided are a sensor unit 11 and a processing unit 12. The sensor unit 11 is specified to capture first, second, third and fourth items of operational information. The optional capturing of additional items of operational information is likewise illustrated. To this end, the sensor unit 11 can access, for example by way of wired or wireless signal lines, the items of operational information captured by the sensors 111, 112, 113, 114, 115 respectively. FIG. 1*b* reproduces a possible arrangement of a plurality of sensors 111, 112, 113, 114, 115.

The angle sensor 111 is specified to capture the first item of operational information, indicative of a position of the slewing gear 19. The position to be captured is presently to be a relative rotation of the slewing gear 19 relative to the substructure 30.

The position sensor 112 is a sensor that captures the second item of operational information, the latter being representative of a position of a mast arm 41. In the exemplary embodiment shown in FIG. 1*a*, the sensor 112 captures the position of the mast arm by way of the inclination angle of the mast arm to this end. The connection of the mast arm to the slewing gear 19 is configured as a fastening by means of an articulated joint at the proximal end of said mast arm. For the movement of the mast arm, the thick matter distributor mast 18 further comprises at least one suitable actuator which presently is configured as an actuating cylinder. Additionally illustrated in the exemplary embodiment of FIG. 1*b* are further position sensors 112 which record items of operational information representative of a position of the further mast arms. Accordingly, these are items of operational information which are of the same type as the second item of operational information.

The leg position sensor 113 is provided for capturing the third item of operational information, indicative of a position of one of the support legs 32. In the process, the horizontal spacing of the set-up surface of the respective support leg 32 in the current operating state in comparison to its zero position in the retracted state is ascertained by the sensor 113. While only one such leg position sensor 113 is illustrated in FIG. 1*a*, and only two such leg position sensors 113 are illustrated in FIG. 1*b*, the sensor unit 11 advantageously comprises a respective corresponding sensor for each of the support legs 32, so that a plurality of items of operation information of the same type as the third item of operational information are captured by the sensor unit 11.

The position sensor 114, which is configured as a spirit level (air level), captures the fourth item of operational information that characterizes an angle of inclination of the thick matter conveying system 10 in relation to the plumb direction.

The optional sensor 115 is configured as an optical sensor and specified for capturing an extension of the thick matter conveying system 10 as the fifth item of operational information. Presently, the extension by way of example is ascertained by way of the respective vertical spacings of the set-up surface of the support legs 32 in comparison to their zero position.

The sensor unit 11 can however also additionally have additional sensors to capture further items of operational information, for example, a user interface for capturing an item of operational information indicative of a type of a thick matter to be conveyed by means of user input or pressure sensors to capture a cylinder force of a mast arm 41 or a leg force of a support leg 32. As a result, the sensor unit 11 is then also to be understood as being set up for capturing the corresponding item of operational information.

The processing unit 12 is specified to determine a stability parameter of the thick matter conveying system 10, depending on the captured items of operational information. The stability parameter characterizes the current stability of the support structure 31 and thus of the thick matter conveying system 10. This can also be done for a definable operating situation, for example before or during a thick matter conveying process. In the present example, the items of operational information taken into account here are the first, second, third, fourth and fifth item of operational information, as well as four further items of operational information (thus one for each mast arm 41) of the same type as the second item of operational information, and three further items of operational information (thus one for each support leg 32) of the same type as the third item of operational information, as described above. Provided to this end for the thick matter conveying system 10 is a corresponding design embodiment of the sensor unit 11 and of the processing unit 12 with hardware and/or software components necessary therefor. For example, the processing unit 12 can thus access data stored in a memory, which comprise items of information pertaining to the respective weight and/or to the respective spatial extent of all components of the thick matter conveying system 10. In the present example, the processing unit 12 determines the stability parameter of the thick matter conveying system 10 by way of a calculation of the current position of the overall center of gravity of the thick matter conveying system 10.

Moreover in the present example, an optional control unit 13 of the thick matter conveying system 10 is additionally configured to actuate one or a plurality of components of the thick matter conveying system 10 by way of control signals, depending on the stability parameter determined by the processing unit 12. Accordingly, the control unit 13 is specified for outputting a first control signal if the stability parameter determined by the processing unit 12 is greater than a maximum stability parameter of the thick matter conveying system 10. In this case, the control unit 13 then limits an operating range of the mast assembly 40 to a currently permissible operating range. Further, the control unit 13 is additionally specified to output a second control signal if the determined stability parameter is less than or equal to the maximum stability parameter.

Figure 2:
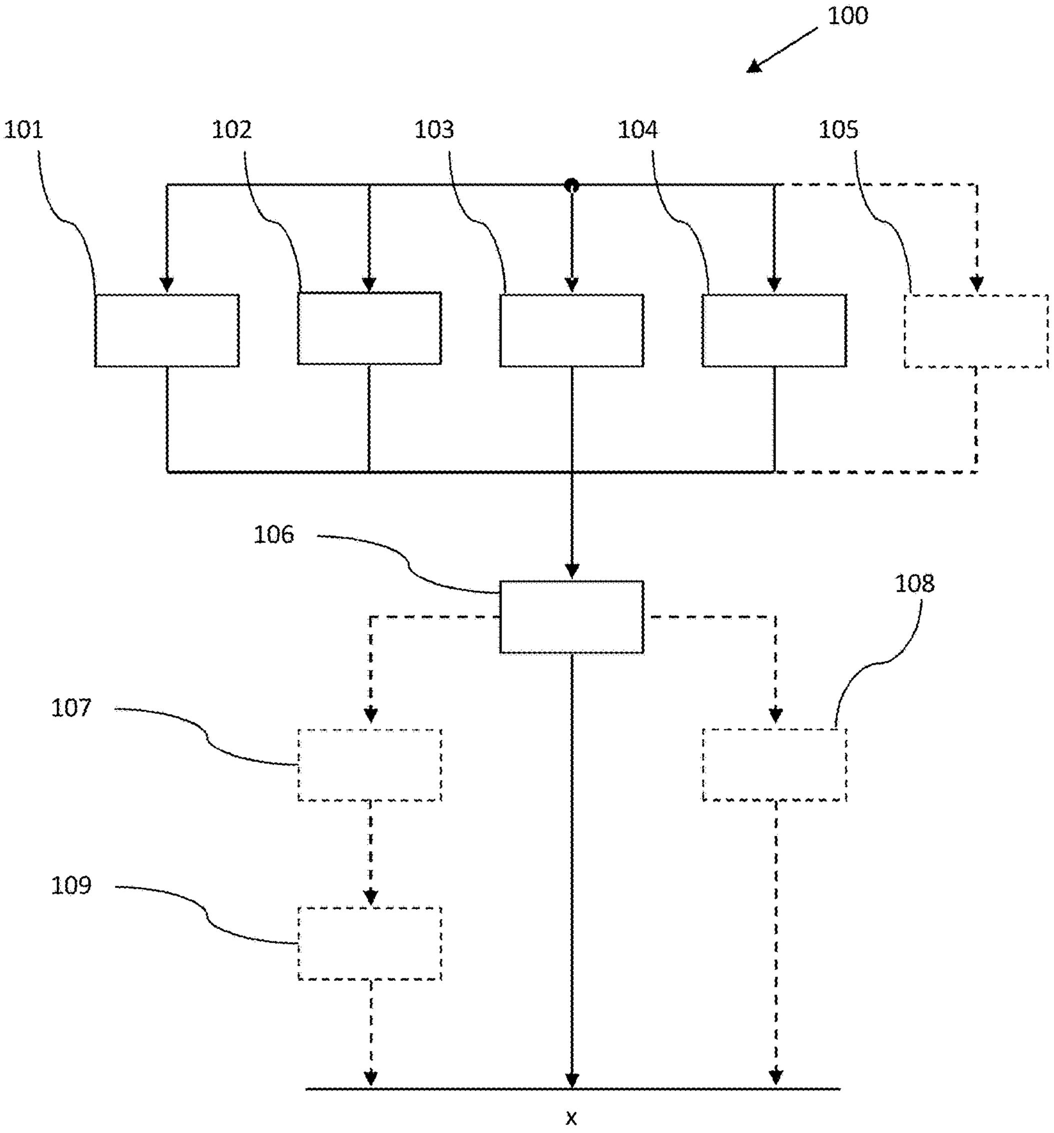
FIG. 2 shows a schematic flow chart of an exemplary embodiment of a method according to the invention.

FIG. 2 shows a flow chart of an exemplary embodiment of a method 100 according to the invention.

In the process steps 101, 102, 103 and 104 and in the optional process step 105, an item of operational information is respectively captured by the sensor unit 11 of the thick matter conveying system 10, for example by the sensors 111, 112, 113, 114 and 115 of the sensor unit 11. The steps 101, 102, 103, 104 and 105 can be performed successively or else at least partially in parallel. In step 101, a first item of operational information is captured, indicative of a position of the slewing gear 19. In step 102, a second item of operational information is captured, indicative of a position of at least one of the mast arms 41. In step 103, a third item of operational information is captured, indicative of a position of the support leg 32. In step 104, a fourth item of operational information is captured, indicative of an inclination angle of the thick matter conveying system 10. In the optional step 105, a fifth item of operational information is captured, indicative of an extension of the thick matter conveying system 10.

Depending on the items of operational information captured in steps 101, 102, 103, 104 and 105, a stability parameter of the thick matter conveying system 10 is determined in step 106 by the processing unit 12. To this end, the processing unit 12 by way of example calculates a current position of the overall center of gravity of the thick matter conveying system 10 from the captured items of operational information, while taking into account the weight and the spatial expansion of all mast arms 41. Further, the mutual positions of the support legs 32, wind surfaces of the structural components, the weights of other components (e.g. of the substructure), as well as defined safety margins or limit values can also be taken into account here.

Optionally, this is followed by one of steps 107 and 108 here.

If the stability parameter of the thick matter conveying system 10 determined by the processing unit 12 is greater than a maximum stability parameter of the thick matter conveying system 10, a control unit of the thick matter conveying system 10 outputs a first control signal in step 107. By means of such a control signal, the control unit actuates at least one component of the thick matter conveying system 10 and thus acts on an operating parameter of the component. This may comprise, for example, a further step 109 in the form of limiting the operating range of the mast assembly 40 to a currently permissible operating range.

In the opposite case, that is, in a determination of the stability parameter of the thick matter conveying system 10 by the processing unit 12 being less than or equal to the maximum stability parameter of the thick matter conveying system 10, the control unit can output a second control signal in a step 108. For example, the control unit can in this way actuate a thick matter pump 16 in that the pumping speed thereof of a core pump of the thick matter pump 16 and/or a switching speed of an S-pipe of the thick matter pump 16 is increased or reduced.

The embodiments of the present invention described in this specification and the optional features and properties listed respectively in this regard are also to be understood as being disclosed in all combinations with one another. In particular, the description of a feature comprised by an embodiment is presently also not to be understood in such a way that the feature is crucial or essential for the functioning of the embodiment—unless explicitly stated to the contrary.

The invention claimed is:

1. A thick matter conveying system (10), having a thick matter pump (16) for conveying thick matter;

a thick matter distributor mast (18) for distributing the thick matter to be conveyed, wherein the thick matter distributor mast (18) has a slewing gear (19) which is rotatable about a vertical axis, and a mast assembly (40) comprising at least two mast arms (41);

a substructure (30) on which are disposed the thick matter distributor mast (18) and the thick matter pump (16), wherein the substructure (30) comprises a support structure (31) for supporting the substructure (30) on a ground by way of at least one horizontally and vertically displaceable support leg (32);

a sensor unit (11) having a plurality of sensors (111, 112, 113, 114, 115) for capturing respectively an item of operational information, wherein the sensor unit (11) captures at least a first item of operational information indicative of a position of the slewing gear (19), a second item of operational information indicative of a position of at least one of the mast arms (41), a third item of operational information indicative of a position of the support leg (32), and a fourth item of operational information indicative of an inclination angle of the thick matter conveying system (10);

a processing unit (12) which dynamically calculates a stability parameter of the thick matter conveying system (10), depending on the captured items of operational information, said calculated stability parameter indicative of a proximity of a line of action of a weight force of the thick matter conveying system (10) to at least one tilting edge of a contact surface between the thick matter conveying system (10) and the underlying ground, and said processing unit (12) compares the calculated stability parameter with a maximum stability parameter corresponding to a tilting limit; and a control unit (13) that outputs a first control signal if the calculated stability parameter is greater than the maximum stability parameter of the thick matter conveying system, and for outputting a second control signal if the calculated stability parameter is less than or equal to the maximum stability parameter of the thick matter conveying system, wherein the calculated stability parameter represents a stability of the thick matter conveying system (10)

including the substructure (30) and the at least one support leg (32) relative to the underlying ground, and outputting the first control signal comprises limiting an operating range of the mast assembly (40) to a currently permissible operating range determined as a function of the calculated stability parameter, while continued operation of the mast assembly (40) within the currently permissible operating range remains enabled.

2. The thick matter conveying system (10) of claim 1, wherein the processing unit (12) calculates a current position of a mast assembly center of gravity of the thick matter conveying system (10), depending on the second captured item of operational information, and calculates the stability parameter, depending on the calculated current position of the mast assembly center of gravity.

3. The thick matter conveying system (10) of claim 2, wherein the processing unit (12) calculates the current position of the mast assembly center of gravity depending on items of operational information indicative of positions of all mast arms (41) of the mast assembly (40).

4. The thick matter conveying system (10) of claim 3, wherein, if for a mast arm (41) an item of operational information indicative of a position of this mast arm (41) cannot be captured by the sensor unit (11), an item of operational information indicative of the position of this mast arm (41) representing a horizontal inclination of the respective mast arm (41) is taken into account when calculating the current position of the mast assembly center of gravity.

5. The thick matter conveying system (10) of claim 2, wherein the sensor unit (11) captures a further item of operational information indicative of a type of a thick matter to be conveyed, and wherein the processing unit (12) calculates the current position of the mast assembly center of gravity depending on the further captured item of operational information and/or calculates the stability parameter depending on the further captured item of operational information.

6. The thick matter conveying system (10) of claim 1, wherein the processing unit (12) calculates a current position of the overall center of gravity of the thick matter conveying system (10) from the captured items of operational information, and calculates the stability parameter depending on the calculated current position of the overall center of gravity.

7. The thick matter conveying system (10) of claim 6, wherein the processing unit (12) calculates the respective spacing of a line of action of at least one force acting on the thick matter conveying system from the tilting edges of the contact surface, and determines the stability parameter depending on the calculated spacing, wherein the at least one force acting on the thick matter conveying system (10) comprises a weight force of the thick matter conveying system (10) acting at the current position of the overall center of gravity of the thick matter conveying system (10).

8. The thick matter conveying system (10) of claim 1, wherein at least two items of operational information of the same type are captured.

9. The thick matter conveying system (10) of claim 1, wherein the sensor unit (11) captures a further item of operational information indicative of an extension of the thick matter conveying system (10).

10. The thick matter conveying system (10) of claim 1, wherein the sensor unit (11) captures a further item of operational information indicative of a horizontal or vertical leg force of the support leg (32).

11. The thick matter conveying system (10) of claim 1, wherein both the slewing gear (19) and a first mast arm (41) of the mast assembly (40) as well as respective two of the mast arms (41) are respectively connected to one another by way of an articulated joint, and wherein the position of a mast arm (41) is continuously detectable by determining the opening angle of the articulated joint at a proximal end of the mast arm (41).

12. The thick matter conveying system (10) of claim 1, wherein the sensor unit (11) captures a further item of operational information indicative of a joint torque of a mast arm (41).

13. The thick matter conveying system (10) of claim 12, wherein the processing unit (12) calculates a load torque based on captured items of operational information indicative of the joint torques of all mast arms (41), and calculates the stability parameter depending on the calculated load torque.

14. The thick matter conveying system (10) of claim 1, wherein the processing unit (12) calculates the stability parameter depending on an item of operational information indicative of a currently permissible theoretically maximum load torque.

15. The thick matter conveying system (10) of claim 1, wherein the thick matter pump (16) comprises a double-piston core pump and a switchable S-pipe having an end which is disposed on an outlet of the thick matter pump and is connectable to a conveying line (17) that extends across the mast assembly, and wherein the sensor unit (11) captures another item of operational information indicative of a pumping speed of the core pump, or a further item of operational information indicative of a switching speed of the S-pipe.

16. The thick matter conveying system (10) of claim 1, wherein the substructure (30) is disposed on a vehicle (33).

17. A method (100) for operating a thick matter conveying system (10) having a thick matter pump (16) for conveying a thick matter, a thick matter distributor mast (18) for distributing the thick matter to be conveyed, a substructure (30) on which are disposed the thick matter distributor mast (18) and the thick matter pump (16), a sensor unit (11) with a plurality of sensors (111, 112, 113, 114, 115) for capturing an item of operational information, respectively, a processing unit (12), and a control unit (13), wherein the thick matter distributor mast (18) has a slewing gear (19) which is rotatable about a vertical axis and a mast assembly (40) comprising at least two mast arms (41), and the substructure (30) comprises a support structure (31) for supporting the substructure (30) by way of at least one horizontally and vertically displaceable support leg (32), the method comprising the steps:

capturing (101) a first item of operational information, indicative of a position of the slewing gear (19);

capturing (102) a second item of operational information, indicative of a position of at least one of the mast arms (41);

capturing (103) a third item of operational information, indicative of a position of the support leg (32);

capturing (104) a fourth item of operational information, indicative of an inclination angle of the thick matter conveying system (10);

dynamically calculating (106), by the processing unit (12), a stability parameter of the thick matter conveying system (10) depending on the captured items of operational information, said calculated stability parameter is indicative of a proximity of a line of action of a weight force of the thick matter conveying system (10) to at least one tilting edge of a contact surface between the thick matter conveying system (10) and the underlying ground;

comparing, by the processing unit (12), the calculated stability parameter with a maximum stability parameter corresponding to a tilting limit;

outputting (107), by the control unit (13), a first control signal if the determined stability parameter of the thick matter conveying system (10) is greater than a maximum stability parameter of the thick matter conveying system (10); and outputting (108), by the control unit (13), a second control signal if the determined stability parameter of the thick matter conveying system (10) is less than or equal to the maximum stability parameter of the thick matter conveying system (10), wherein outputting the first control signal comprises limiting an operating range of the mast assembly (40) to a currently permissible operating range determined as a function of the calculated stability parameter, while continued operation of the mast assembly (40) within the currently permissible operating range remains enabled.

* * * * *